United States Patent
Sahoo et al.

(10) Patent No.: US 11,876,458 B2
(45) Date of Patent: Jan. 16, 2024

(54) HYBRID CHARGER AND INVERTER SYSTEM

(71) Applicant: Apple Inc., Cupertino, CA (US)

(72) Inventors: Ashish K. Sahoo, Santa Clara, CA (US); Jie Lu, San Jose, CA (US); Brandon Pierquet, San Francisco, CA (US); Anish Prasai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 17/457,377

(22) Filed: Dec. 2, 2021

(65) Prior Publication Data

US 2023/0089072 A1 Mar. 23, 2023

Related U.S. Application Data

(60) Provisional application No. 63/261,544, filed on Sep. 23, 2021, provisional application No. 63/261,548, (Continued)

(51) Int. Cl.
*H02J 9/04* (2006.01)
*H02M 5/293* (2006.01)
(Continued)

(52) U.S. Cl.
CPC .......... *H02M 5/2932* (2021.05); *H02J 9/062* (2013.01); *H02M 1/083* (2013.01);
(Continued)

(58) Field of Classification Search
CPC .......... H02J 9/062; H02J 2207/20; H02J 3/32; H02M 3/33584
See application file for complete search history.

(56) References Cited

U.S. PATENT DOCUMENTS

| 10,562,404 | B1 | 2/2020 | Khaligh | |
| 2006/0151219 | A1* | 7/2006 | Khan | B60L 1/006 180/65.1 |

(Continued)

FOREIGN PATENT DOCUMENTS

| CN | 101064438 B | * 12/2010 | ........... H02J 1/10 |
| CN | 107222112 A | * 9/2017 | |

(Continued)

OTHER PUBLICATIONS

International Search Report and Written Opinion for PCT Application No. PCT/US2022/029053 dated Aug. 16, 2022; 10 pgs.

(Continued)

*Primary Examiner* — Harry R Behm
(74) *Attorney, Agent, or Firm* — FLETCHER YODER PC

(57) ABSTRACT

An electrical system can include an isolated bidirectional converter (having an input couplable to a grid connection and an output couplable to a battery) and an isolated converter (having an input coupled to the input of the isolated bidirectional converter and couplable to the grid connection, with an AC output coupled to a convenience outlet). The electrical system can further include a controller that controls operation of the converters to operate in one of a plurality of modes including a charging mode in which the isolated bidirectional converter operates in a forward direction to charge the battery and the non-isolated converter powers the convenience outlet from the grid connection, and a non-charging mode in which the isolated bidirectional converter operates in a reverse direction to power the non-isolated converter from the battery and the non-isolated converter powers the convenience outlet.

10 Claims, 11 Drawing Sheets

Related U.S. Application Data filed on Sep. 23, 2021, provisional application No. 63/261,545, filed on Sep. 23, 2021.

(51) Int. Cl.
*H02M 1/08* (2006.01)
*H02J 9/06* (2006.01)
*H02M 3/335* (2006.01)
*H02M 7/797* (2006.01)
*H02J 3/32* (2006.01)
*H02J 7/02* (2016.01)

(52) U.S. Cl.
CPC ....... *H02M 3/33584* (2013.01); *H02M 7/797* (2013.01); *H02J 3/32* (2013.01); *H02J 7/02* (2013.01); *H02J 2207/20* (2020.01)

(56) References Cited

U.S. PATENT DOCUMENTS

| | | | |
|---|---|---|---|
| 2008/0203820 A1* | 8/2008 | Kramer | H02J 3/40 307/64 |
| 2011/0115295 A1 | 5/2011 | Moon et al. | |
| 2014/0368043 A1* | 12/2014 | Colombi | H02J 3/32 307/66 |
| 2015/0280595 A1* | 10/2015 | White | H02P 23/18 318/807 |
| 2018/0015834 A1 | 1/2018 | Karison et al. | |
| 2020/0220450 A1* | 7/2020 | Higashiyama | H02M 3/33571 |
| 2022/0009649 A1 | 1/2022 | Mulders et al. | |

FOREIGN PATENT DOCUMENTS

| | | | | |
|---|---|---|---|---|
| CN | 108347067 A | * | 7/2018 | ................ H02J 3/32 |
| JP | 2015011507 A | * | 1/2015 | |
| KR | 102176094 B1 | * | 11/2020 | |
| WO | 2019/071360 A1 | | 4/2019 | |

OTHER PUBLICATIONS

Office Action for U.S. Appl. No. 17/457,376 dated Jul. 5, 2023; 23 pgs.

* cited by examiner

HYBRID CHARGER AND INVERTER SYSTEM

CROSS-REFERENCE TO RELATED APPLICATIONS

This application claims priority to U.S. Provisional Application No. 63/261,544, filed Sep. 23, 2021, entitled "Hybrid Charger and Inverter System", and U.S. Provisional Application No. 63/261,545, filed Sep. 23, 2021, entitled "Hybrid Charger and Inverter System," and U.S. Provisional Application No. 63/261,548, filed Sep. 23, 2021, entitled "Hybrid Charger and Inverter System," the disclosures of which are incorporated by reference in their entirety for all purposes.

BACKGROUND

In many applications it may be desirable to provide one or more alternating current (AC) convenience outlets from battery-based direct current (DC) power system. These AC convenience outlets may be employed by a user for powering any of a variety of AC loads, ranging from laptop power supplies to household appliances and the like. Exemplary battery-based DC power systems may include electric vehicles, grid-battery-storage systems, portable power banks, and other systems. Battery-based DC systems may have an AC grid connection for charging the battery and an associated charger (i.e., AC-DC converter) for converting the AC grid power to DC power suitable for charging the battery. In some applications, inclusion of an additional converter to generate the AC voltage needed for the convenience outlet(s) may not be desirable.

SUMMARY

In some cases, it may be desirable to repurpose this converter to generate the AC voltage needed for the convenience outlet. For example, this can reduce power device component count, cost, and weight of the battery-based DC power system. Exemplary arrangements along these lines are described herein.

An electrical system can include a first bidirectional AC-DC converter having an AC input couplable to an AC grid connection and a DC output couplable to a battery, and a second bidirectional AC-DC converter having an AC input selectively couplable to the AC grid connection or a convenience outlet and a DC output couplable to the battery.

The second bidirectional AC-DC converter AC input may be selectively couplable to the AC grid connection or the convenience outlet by first and second switches. The first switch can be coupled between the AC input of the first bidirectional AC-DC converter and the AC input of the second bidirectional AC-DC converter, and the second switch can be coupled between the AC input of the second bidirectional AC-DC converter and the convenience outlet. The second switch can be further coupled between the first switch and the convenience outlet. The first and second switches can be single pole switches.

The electrical system can further include a controller configured to toggle the first and second switches and control operation of the first and second bidirectional converters to operate in one of a plurality of modes including a two-stage charging mode in which the controller operates both the first and second bidirectional converters in a forward direction to charge the battery, a single-stage charging mode in which the controller operates the first bidirectional converter in a forward direction to charge the battery and operates the second bidirectional converter in a reverse direction to power the convenience outlet, and a non-charging mode in which the controller idles the first bidirectional converter and operates the second bidirectional converter in a reverse direction to power the convenience outlet. In the two-stage charging mode the controller can close the first switch and open the second switch, and in the single-stage charging mode and the non-charging mode the controller can open the first switch and close the second switch.

The electrical system can further include a controller configured to control operation of the first and second bidirectional converters to operate in one of a plurality of modes including a two-stage charging mode in which the controller operates both the first and second bidirectional converters in a forward direction to charge the battery, a single-stage charging mode in which the controller operates the first bidirectional converter in a forward direction to charge the battery and operates the second bidirectional converter in a reverse direction to power the convenience outlet, and a non-charging mode in which the controller idles the first bidirectional converter and operates the second bidirectional converter in a reverse direction to power the convenience outlet.

A method performed by a controller of an electrical system having an AC grid connection, a DC battery connection, an AC convenience outlet connection, two bidirectional AC-DC converters, and a controller can include determining whether operation of the convenience outlet is required, and, if not, coupling AC inputs of the two bidirectional AC-DC converters to the AC grid connection and operating the two bidirectional AC-DC converters in a forward direction to charge a DC battery coupled to the DC battery connection. If operation of the convenience outlet is required, the method can further include determining at least one of whether an AC grid is connected to the AC grid connection and whether battery charging is required, and, if either an AC grid is not connected or battery charging is not required, idling a first of the two bidirectional AC-DC converters, coupling an AC input of a second of the two-bidirectional AC-DC converters to the convenience outlet, and operating the second bidirectional AC-DC converter in a reverse direction to power the convenience outlet.

If an AC grid is connected and battery charging is required, the method can further include determining if the connected AC grid voltage is suitable for the convenience outlet. If the AC grid voltage is suitable for the convenience outlet the method can further include coupling AC inputs of the two bidirectional AC-DC converters to the AC grid connection and operating the two bidirectional AC-DC converters in a forward direction to charge a DC battery coupled to the DC battery connection and coupling the AC grid to the convenience outlet. If the AC grid voltage is not suitable for the convenience outlet, the method can further include coupling an AC input of a first of the two bidirectional AC-DC converters to the AC grid connection, operating the first bidirectional AC-DC converter in a forward direction to charge a DC battery coupled to the DC battery connection, coupling an AC input of a second of the two-bidirectional AC-DC converters to the convenience outlet, and operating the second bidirectional AC-DC converter in a reverse direction to power the convenience outlet.

A method performed by a controller of an electrical system having an AC grid connection, a DC battery connection, an AC convenience outlet connection, two bidirectional AC-DC converters, a plurality of switches, and a controller, can include determining whether operation of the convenience outlet is required and, if not, toggling the plurality of switches to couple AC inputs of the two bidirectional AC-DC converters to the AC grid connection and operating the two bidirectional AC-DC converters in a forward direction to charge a DC battery coupled to the DC battery connection. If operation of the convenience outlet is required, the method can further include determining at least one of whether an AC grid is connected to the AC grid connection and whether battery charging is required, and, if either an AC grid is not connected or battery charging is not required, idling a first of the two bidirectional AC-DC converters, toggling the plurality of switches to couple an AC input of a second of the two-bidirectional AC-DC converters to the convenience outlet, and operating the second bidirectional AC-DC converter in a reverse direction to power the convenience outlet.

If an AC grid is connected and battery charging is required, the method can further include determining if the connected AC grid voltage is suitable for the convenience outlet. If the AC grid voltage is suitable for the convenience outlet the method can further include toggling the plurality of switches to couple AC inputs of the two bidirectional AC-DC converters to the AC grid connection and operating the two bidirectional AC-DC converters in a forward direction to charge a DC battery coupled to the DC battery connection and coupling the AC grid to the convenience outlet. If the AC grid voltage is not suitable for the convenience outlet, the method can further include toggling the plurality of switches to couple an AC input of a first of the two bidirectional AC-DC converters to the AC grid connection and to couple an AC input of a second of the two-bidirectional AC-DC converters to the convenience outlet, operating the first bidirectional AC-DC converter in a forward direction to charge a DC battery coupled to the DC battery connection, and operating the second bidirectional AC-DC converter in a reverse direction to power the convenience outlet.

An electrical system can include an isolated bidirectional converter having an input couplable to an AC grid connection and an output couplable to a battery and a non-isolated converter having an input coupled to the input of the isolated bidirectional converter and selectively couplable to the AC grid connection and an AC output coupled to a convenience outlet. The input of the isolated bidirectional converter and the input of the non-isolated converter can be selectively couplable to the AC grid connection by a switch. The switch can be a single pole switch. The electrical system can further include a controller configured to toggle the switch and control operation of the isolated bidirectional converter and the non-isolated converter to operate in one of a plurality of modes, including a charging mode in which the isolated bidirectional converter operates in a forward direction to charge the battery and the non-isolated converter powers the convenience outlet from the grid connection and a non-charging mode in which the isolated bidirectional converter operates in a reverse direction to power the non-isolated converter from the battery and the non-isolated converter powers the convenience outlet. In the charging mode the controller can close the switch, and in the discharging mode the controller can open the switch.

The charging mode can include at least one of a power factor correction mode and a harmonics compensation mode. In the power factor correction mode the isolated bidirectional converter can be operated to correct the power factor of a load coupled to the convenience outlet such that the grid connection sees a unity power factor. In the harmonics compensation mode the isolated bidirectional converter can be operated to compensate for harmonics introduced by the load coupled to the convenience outlet. The discharging mode can include at least one of: a first discharging mode in which the isolated bidirectional converter is operated in the reverse direction to produce an output voltage having a magnitude tracking the battery voltage; a second discharging mode in which the isolated bidirectional converter is operated in the reverse direction to produce an output voltage having a magnitude suitable for the convenience outlet; and a third discharging mode in which the isolated bidirectional converter is operated in the reverse direction to produce an output voltage having a magnitude corresponding to a voltage of the AC grid. In the first discharging mode the isolated bidirectional converter can perform regulation of the output voltage for the convenience outlet. In the second discharging mode the isolated bidirectional converter can operate as a pass-through. In the third discharging mode the isolated bidirectional converter can operate as a fixed ratio converter. In each discharging mode the output voltage can be an AC or a DC voltage.

The AC-AC converter can include a stack of four switching devices. An input of the AC-AC converter can be coupled across the stack of four switching devices, and an output of the AC-AC converter can be taken from a connection point of first and second switching devices of the stack and a junction of third and fourth switching devices of the stack. The converter can further include input capacitors coupled in series across the input of the AC-AC converter, with a connection point of the input capacitors coupled to a connection point of the second and third switching devices. The converter can further include at least one output filter inductor and at least one output filter capacitor coupled to the output of the AC-AC converter. The AC-AC converter can further include a resonant tank made up of at least one resonant capacitor and at least one resonant inductor, wherein the resonant tank facilitates zero voltage switching of the switching devices. Alternatively, the AC-AC converter can include a plurality of bidirectional switching devices, wherein an input of the AC-AC converter is coupled across the bidirectional switching devices and an output of the AC-AC converter is taken from a connection point of the bidirectional switching devices. Such a converter can further include at least one input capacitor coupled across the input of the AC-AC converter and at least one output filter inductor and at least one output filter capacitor coupled to the output of the AC-AC converter. The bidirectional switches can be configured as a full bridge converter or as a half bridge converter.

A method can be performed by a controller of an electrical system having an AC grid connection, a DC battery connection, an AC convenience outlet connection, an isolated bidirectional converter, a non-isolated converter, and a controller. The method can include determining whether an AC power source is coupled to the AC grid connection and, if not, operating the isolated bidirectional converter in a reverse direction to provide power to the non-isolated converter from the battery and operating the non-isolated converter to power the convenience outlet. If an AC power source is coupled to the AC grid connection, the method can further include operating the isolated bidirectional converter in a forward direction to charge the battery from the AC grid and operating the non-isolated converter to power the convenience outlet from the AC grid. Operating the isolated bidirectional converter in a forward direction to charge the battery from the grid and operating the non-isolated converter to power the convenience outlet from the AC grid can further include comprises at least one of a power factor correction mode and a harmonics compensation mode. In the power factor correction mode, operating the isolated bidirectional converter can include correcting the power factor of a load coupled to the convenience outlet such that the grid connection sees a unity power factor. In the harmonics compensation mode, operating the isolated bidirectional converter can include compensating for harmonics introduced by the load coupled to the convenience outlet.

Operating the isolated bidirectional converter in the reverse direction to provide power to the non-isolated converter from the battery and operating the non-isolated converter to power the convenience outlet can include at least one of three discharging modes. In a first discharging mode, operating the isolated bidirectional converter in the reverse direction can include producing an output voltage having a magnitude tracking the battery voltage. In a second discharging mode, operating the isolated bidirectional converter in the reverse direction can include producing an AC output voltage having a magnitude suitable for the convenience outlet. In a third discharging mode, operating the isolated bidirectional converter in the reverse direction can include producing an AC output voltage having a magnitude corresponding to a voltage of the AC grid. In the first discharging mode operating the non-isolated converter can include regulating the output voltage for the convenience outlet. In the second discharging mode, operating the non-isolated converter can include operating as a pass-through. In the third discharging mode, operating the non-isolated converter comprises operating as a fixed ratio converter. In each discharging modes the output voltage can be an AC or a DC voltage.

An AC-AC converter can include a stack of four switching devices. An input of the AC-AC converter can be coupled across the stack of four switching devices, and an output of the AC-AC converter can be taken from first terminal coupled to a connection point of first and second switching devices of the stack and a second terminal coupled to a connection point of third and fourth switching devices of the stack. The AC-AC converter can further include first and second series-connected input capacitors coupled across the input of the AC-AC converter, with a connection point of the series-connected input capacitors coupled to a connection point of the second and third switching devices. The AC-AC converter can further include at least one output filter inductor and at least one output filter capacitor coupled to the output of the AC-AC converter. The at least one filter inductor can include a first filter inductor coupled between the first terminal and a load. The at least one filter inductor can include a second inductor coupled between the second terminal and the load.

The AC-AC converter can further include a resonant tank made up of at least one resonant capacitor and at least one resonant inductor. The resonant tank can facilitate zero voltage switching of the switching devices. The resonant tank can be a series resonant circuit coupled between the first terminal and the second terminal. The resonant tank can be a series resonant circuit coupled in parallel with the at least one output filter inductor.

The AC-AC converter can further include a controller that operates the switching devices such that during a positive half cycle of an AC input voltage, first and second switching devices of the stack are operated with an alternating 50% duty cycle and third and fourth switching devices of the stack are constantly on, and during the negative half cycle of the AC input voltage, the third and fourth switching devices of the stack are operated with an alternating 50% duty cycle and the first and second switching devices of the stack are constantly on. During the positive half cycle, the duration of the on-times of the first and second switching devices determine the magnitude of the AC voltage between the first and second terminals. During the negative half cycle, the duration of the on times of the third and fourth switching devices determine the magnitude of the AC voltage between the first and second terminals.

A method performed by a controller of an AC-AC converter having a stack of four switching devices, wherein an input of the AC-AC converter is coupled across the stack of four switching devices and an output of the AC-AC converter is taken from first terminal coupled to a connection point of first and second switching devices of the stack and a second terminal coupled to a connection point of third and fourth switching devices of the stack, can include, during a positive half cycle of an AC input voltage, operating first and second switching devices of the stack with an alternating 50% duty cycle and turning on and leaving on third and fourth switching devices of the stack; and during a negative half cycle of the AC input voltage, operating the third and fourth switching devices of the stack with an alternating 50% duty cycle, and turning on and leaving on the first and second switching devices of the stack. During the positive half cycle, the duration of the on-times of the first and second switching devices can determine the magnitude of the AC voltage between the first and second terminals, and, during the negative half cycle, the duration of the on times of the third and fourth switching devices determine the magnitude of the AC voltage between the first and second terminals. The switching devices can be operated with zero voltage switching.

An AC-AC converter can include a plurality of bidirectional switching devices. An input of the AC-AC converter can be coupled across the bidirectional switching devices, and an output of the AC-AC converter is taken from a connection point of the bidirectional switching devices. The converter can further include at least one input capacitor coupled across the input of the AC-AC converter and at least one output filter inductor and at least one output filter capacitor coupled to the output of the AC-AC converter. The bidirectional switches can be configured as a full bridge converter or as a half bridge converter.

DETAILED DESCRIPTION

Figure 1:
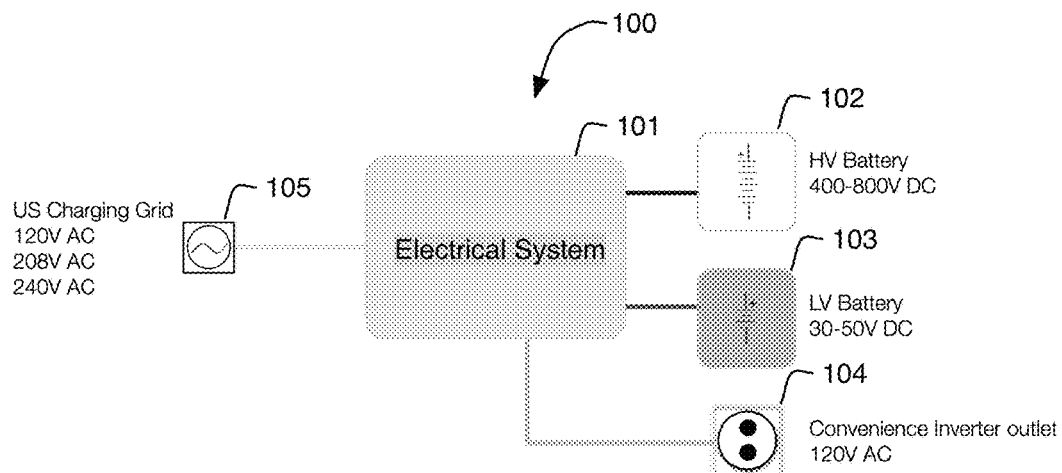
FIG. 1 illustrates a block diagram of an exemplary battery-based DC power system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a high level block diagram of an arrangement 100 including a DC electrical system 101. Electrical system 101 may be coupled to one or more of multiple power sources, including a high voltage battery 102, a low voltage battery 103, and an AC grid 105. In the illustrated example, high voltage battery 102 may have a voltage ranging from 400-800V DC, although other voltage ranges may be used if appropriate for a given application. As used herein, "high voltage" generally means a voltage higher than the nominal utility supply voltage for plug-in devices in residential or commercial service, e.g., 120V in the U.S. or 230V in Europe. Similarly, low voltage battery 103 may have a voltage ranging from 30-50V DC, although other voltage ranges may be used if appropriate for a given application. As used herein, "low voltage" generally means a voltage lower than the nominal utility supply voltage for typical residential or commercial service as described above. The charging grid may be any standardized voltage available in the United States or other regions of the world. In the United States, typical AC grid voltages for residential or commercial service include 120V, 208V, and/or 240V AC, including single phase, split phase, and three phase configurations. In various applications, electrical system 101 may also be operable to deliver power to one or more of these power "sources," as well as to its own internal loads (e.g., the traction motor(s) of an electric vehicle).

To that end, electrical system 101 may include various power conversion circuitry, described in greater detail below, for converting electrical energy received from one or more of the "sources" to a level suitable for another of the "sources." For example, electrical system 101 may include circuitry for converting the voltage from AC grid 105 into a suitable voltage for charging high voltage battery 102 and/or low voltage battery 103. This arrangement may be included in applications such as electric vehicles, uninterruptible power supplies, grid battery storage systems, etc. Additionally or alternatively, electrical system 101 may include circuitry for converting the voltage from high voltage battery 102 and/or low voltage battery 103 to the grid voltage. Such applications may include UPSs and grid battery storage systems. In many applications, including each of the foregoing as well as others, it may also be desirable to provide power to an AC "convenience outlet" 104 that may be used to power any of a variety of typical AC loads, such as laptop chargers, small appliances, etc. There could be any number of reasons that it may be desirable to use some of the above-described power conversion circuitry as an inverter (i.e., DC to AC converter) produce the AC voltage for convenience outlet 104. Some such reasons include cost reduction, weight reduction, size reduction, and the like.

Figure 2:
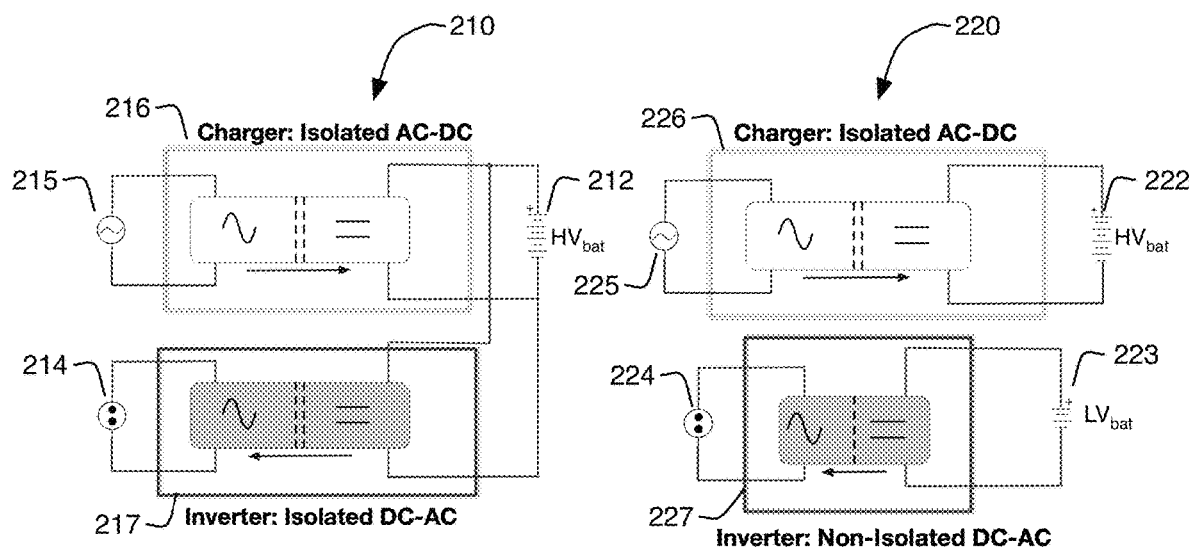
FIG. 2 illustrates prior art configurations for generating an AC voltage.

FIG. 2 illustrates two prior art approaches for powering AC convenience outlets from battery-based DC power systems. Approach 210 employs an isolated AC-DC charger 216 to convert voltage from the AC grid 215 to a level suitable for high voltage battery 212. Because of the high battery voltage, an isolated inverter 217 is provided to generate the low voltage AC (e.g., 120V AC) that powers convenience outlet 226. Approach 220 employs an isolated AC-DC charger 226 to convert voltage from the AC grid 225 to a level suitable for high voltage battery 222. However, because convenience outlet is powered from low voltage battery 223, a non-isolated inverter 227 may be used. (Not shown in approach 220 is a mechanism for charging low voltage battery, which may be done from the high voltage DC bus corresponding to high voltage. battery 222 and/or from the AC bus corresponding to AC grid 225.) A disadvantage of either arrangement is the requirement of additional converter hardware, i.e., isolated inverter 217 or non-isolated inverter 227, which adds cost, complexity, weight, and volume to a given device. Further disadvantages of approach 220 include the requirement for two conversion stages (a DC-DC boost stage to increase the voltage from the low voltage battery and an inverter stage to generate the AC voltage) and the potential for high current draw from the low voltage battery (depending on the load on the convenience outlet).

Figure 3A:
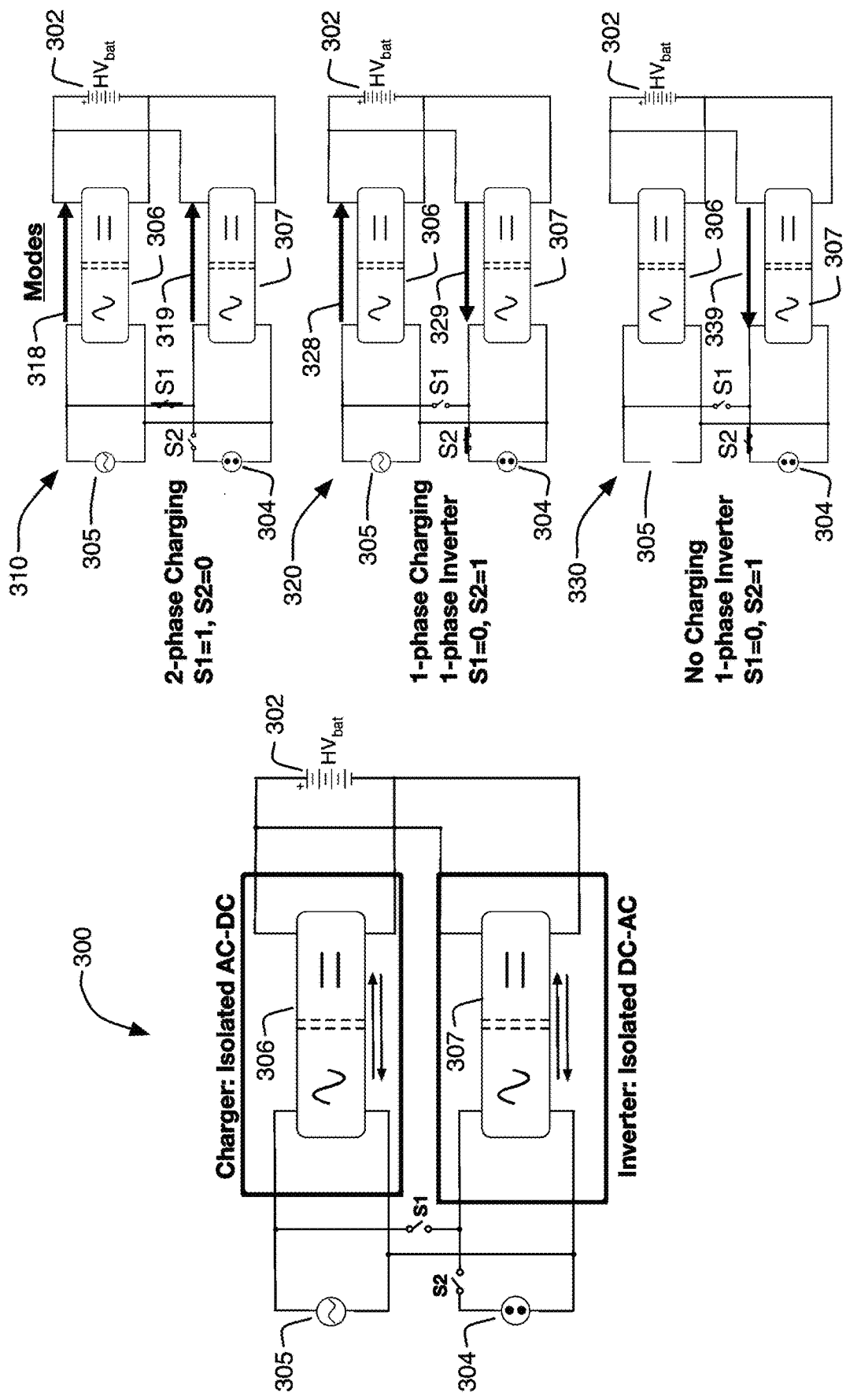
FIG. 3A illustrates a two-stage charger circuit in which one phase may be reused as an inverter to provide an AC voltage.

FIG. 3A illustrates a battery based electrical system 300 using a high voltage battery 302. Electrical system 300 includes dual isolated AC-DC charger stages 306 and 307. Charger stages 306 and 307 may be bidirectional chargers, allowing for power delivery in either direction, i.e., either as AC-DC converters in the forward direction or DC-AC converters in the reverse direction. Various examples of such converters are known to those ordinarily skilled in the art, and thus the details of their construction, control, and operation are omitted for brevity. Charger stages 306 and 307 may be operated in parallel in the forward direction to charge high voltage battery 302 from AC grid 305, allowing for the combined power rating of the two stages to be delivered to the battery for more rapid charging. Additionally, charger stage 307 may be operated in the reverse direction as an isolated DC-AC converter (i.e., inverter) allowing for convenience outlet 304 to be powered from high voltage battery 305. Switches S1 and S2 may be provided to allow for directly powering convenience outlet 304 from AC grid 305 if connected to a suitable voltage and/or for isolating the AC side of charger stage 307 from the AC grid when used as an inverter to power convenience outlet 304. This can result in various operating modes 310, 320, and 330, illustrated on the right side of FIG. 3A.

Operating mode 310 corresponds to the dual stage charging operation described above. In this mode, isolated charger 306 is operated in the forward direction 318 to deliver power from AC grid 305 to high voltage battery 302. Switch S1 is closed, and switch S2 is opened. Thus, power is not provided to convenience outlet 304, but the AC side of isolated charger 307 is connected to AC grid 305. Isolated charger 307 is also operated in the forward direction 319 to deliver power from AC grid 305 to high voltage battery 302. In this mode, the amount of power delivered to high voltage battery 302 is increased, e.g., doubled as compared to mode 320, but convenience outlet may not be available. (In some applications, if a suitable voltage is supplied by grid 305, switch S2 could also be closed, coupling AC grid 305 to convenience outlet 304. Additional overcurrent protection (not shown) for convenience outlet 304 may be necessary in this configuration.

Operating mode 320 corresponds to one stage charging, one stage inverting operation as described above. In this mode, isolated charger 306 is operated in the forward direction 328 to deliver power from AC grid 305 to high voltage battery 302. Switch S1 is open, and switch S2 is closed. Thus, power from AC grid 305 is not provided to the AC side of isolated converter 307, which may now be operated in reverse direction 329 as an inverter to power convenience outlet 304. In this mode, the amount of power delivered to high voltage battery 302 is decreased, e.g., halved as compared to mode 310, but convenience outlet is available for use.

Operating mode 330 corresponds to no charging, with one stage inverting operation. In this mode, isolated charger 306 is not operated, e.g., because grid 305 is not available. (Mode 330 could also be used when AC grid 305 is available but high voltage battery 302 is fully charged. Switch S1 is open, and switch S2 is closed. Thus, the AC sides of converters 306 and 307 are decoupled/disconnected. Converter 307 may be operated in reverse direction 329 as an isolated inverter to power convenience outlet 304. In the foregoing description, of operating modes 310, 320, and 330, switches S1 and S2 are illustrated as single pole switches; however, double pole switches could be provided to disconnect the line and/or neutral legs if desired in a given application. Such configurations are illustrated in FIG. 3C in which additional switch poles S1' and S2' are illustrated with switch poles S1 and S1' having the same switching state and switches S2 and S2' having the same switching state.

Figure 3B:
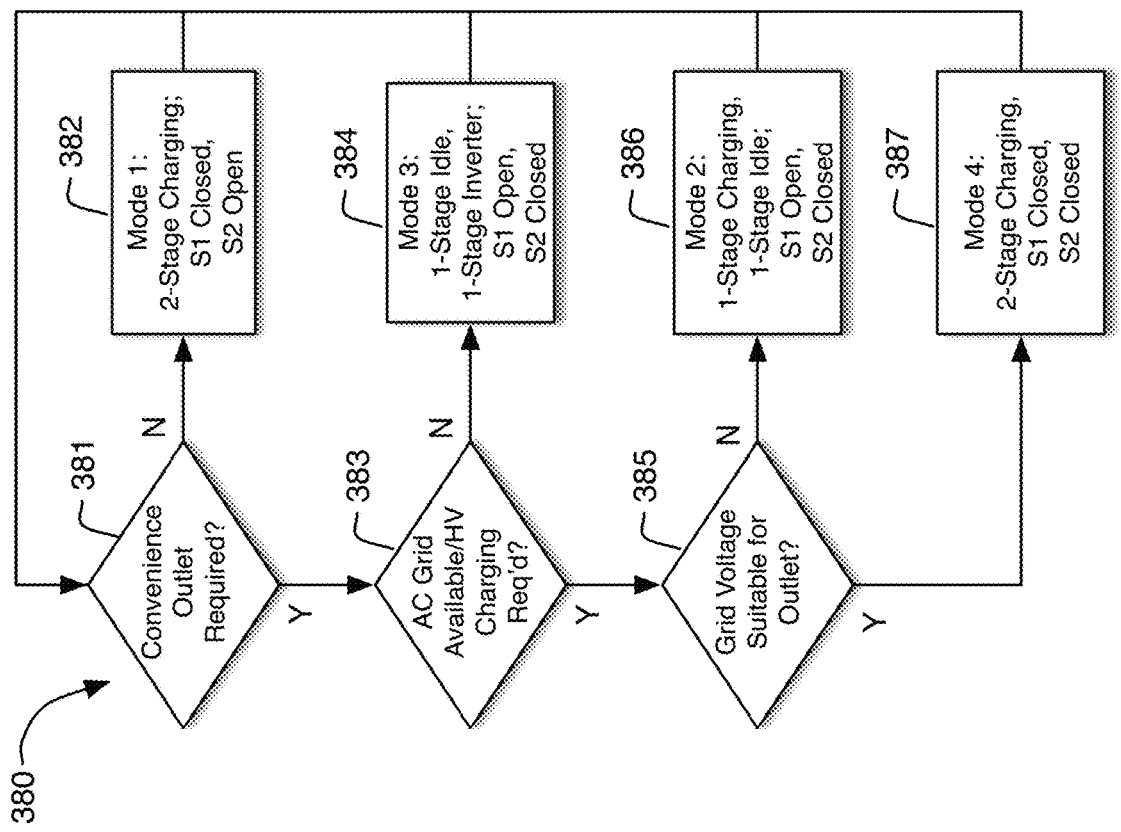
FIG. 3B illustrates a flow chart of operating modes of the two-stage charger circuit of FIG. 3A.
Figure 3C:
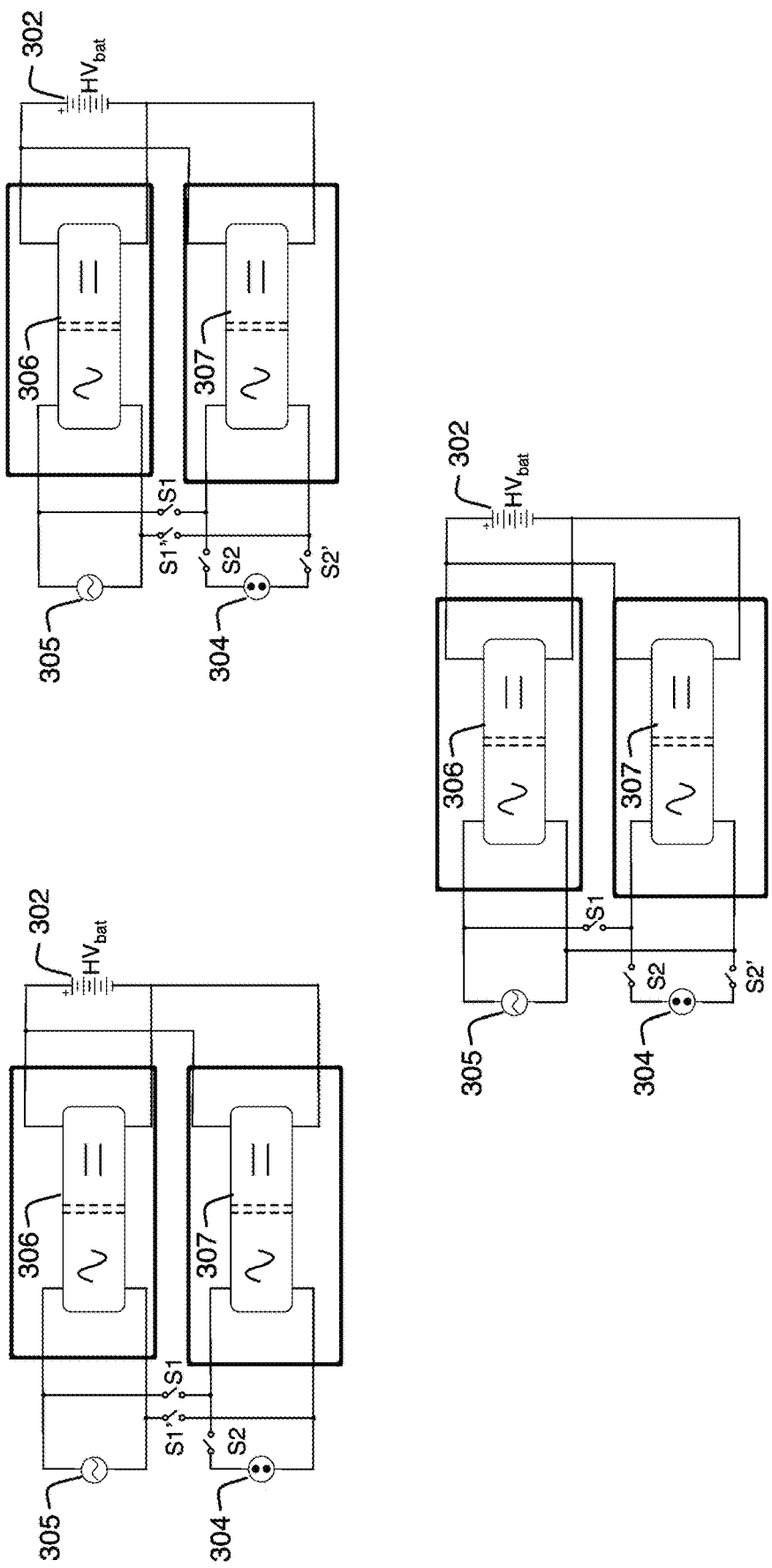
FIG. 3C illustrates alternative switch configurations of the charger circuit in FIG. 3A.

FIG. 3B illustrates a flow chart of an operating method 380 of the converter and operating modes of FIG. 3A. The flow chart may be implemented by any suitable controller circuitry, including a programmable controller (such as a microcontroller or microprocessor), a field programmable gate array, discrete logic control circuits, application specific integrated circuits, etc. Beginning at block 381, the controller can determine whether the convenience outlet is required. If not, in block 382, the electrical system can be placed in Mode 1 (discussed above) including two stage charging. In this mode, switch S1 is closed and switch S2 is open, and both isolated charger stages are operated in the forward direction to charge the high voltage battery from the AC grid.

In block 381, if the controller determines that the convenience outlet is required, then the controller can determine whether the AC grid is available and if charging the high voltage battery is required (block 383). If either the AC grid is not available or if HV charging is not required, the controller can enter Mode 3 (block 384) in which one converter is idled and one stage is operated as an inverter. In this mode, switch S1 is open and switch S2 is closed. Otherwise, in block 383, if the controller determines that the AC grid is available and HV charging is required, then in block 385 the controller can determine whether the grid voltage is suitable for direct connection to the convenience outlet. If so, the controller can enter mode 4 (block 387) in which one stage is charging, one stage is operating as an inverter, and both switches S1 and S2 are closed. Otherwise, the controller can enter mode 2 (block 386) in which one stage is charging one stage is operating as an inverter, and switch S1 is open and switch S2 is closed.

Figure 4A:
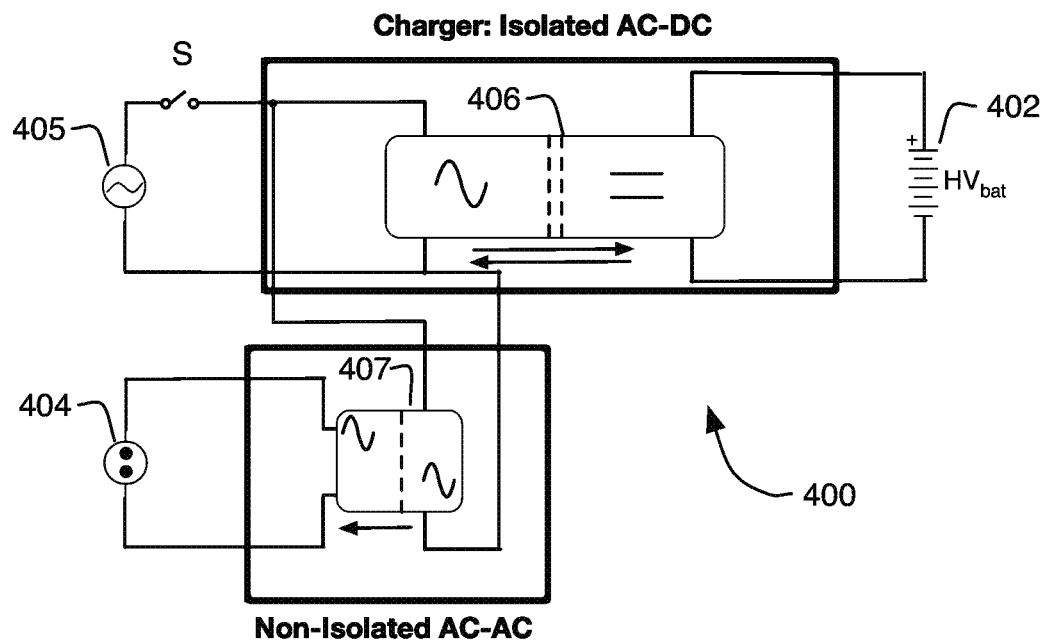
FIG. 4A illustrates a single-stage charger and non-isolated AC-AC converter circuit that may be used to provide an AC voltage.

FIG. 4A illustrates a battery based electrical system 400 using a high voltage battery 402. Electrical system 400 includes a single isolated AC-DC charger stage 406. Charger stage 406 may be a bidirectional charger, allowing for power delivery in either direction, i.e., either as an AC-DC converter in the forward direction or DC-AC converter in the reverse direction. In some embodiments, isolated charger stage 406 may also be operated as a DC-DC converter, as described in greater detail below. Additionally, a non-isolated AC-AC converter 407 may be provided, which can convert the voltage appearing at the AC side of converter 406 to a suitable level for convenience outlet 404. In some embodiments, non-isolated converter 407 can be operated as a DC-AC converter (i.e., inverter), as described in greater detail below. Various examples of both converter types are known to those ordinarily skilled in the art, and thus the details of their construction, control, and operation are omitted here for brevity, although exemplary AC-AC converters are described below with reference to FIGS. 8 and 9. Charger stage 406 may be operated in the forward direction to charge high voltage battery 402 from AC grid 405 and also powering AC-AC converter 407, which, in turn, powers convenience outlet 404. Alternatively, charger stage 406 may be operated in the reverse direction as an isolated DC-AC converter (i.e., inverter) allowing for convenience outlet 404 to be powered from high voltage battery 402. Switch S may be provided for isolating the AC side of charger stage 307 from the AC grid when used as an inverter to power convenience outlet 304. This can result in charging operating mode 410 and non-charging operating mode 420 illustrated in the lower portion of FIG. 4A.

Operating mode 410 corresponds to the charging operation described above. In this mode, isolated charger 406 is operated in the forward direction 418 to deliver power from AC grid 405 to high voltage battery 402. Switch S is closed. Thus, power 429 is provided to convenience outlet 304 via AC-AC converter 407. Operating mode 420 corresponds to the not charging operation described above. In this mode, isolated charger 406 is operated in the reverse direction 428 to deliver power from high voltage battery 402 to AC-AC converter 407. Switch S is open, thereby isolating the AC grid 405 connection from converters 406 and 407. In some embodiments, switch S could be a two pole switch with additional switch pole S' serving to disconnect the grid neutral connection as illustrated in FIG. 4B. In such configurations, switch poles S and S' have the same switching state.

Figure 5:
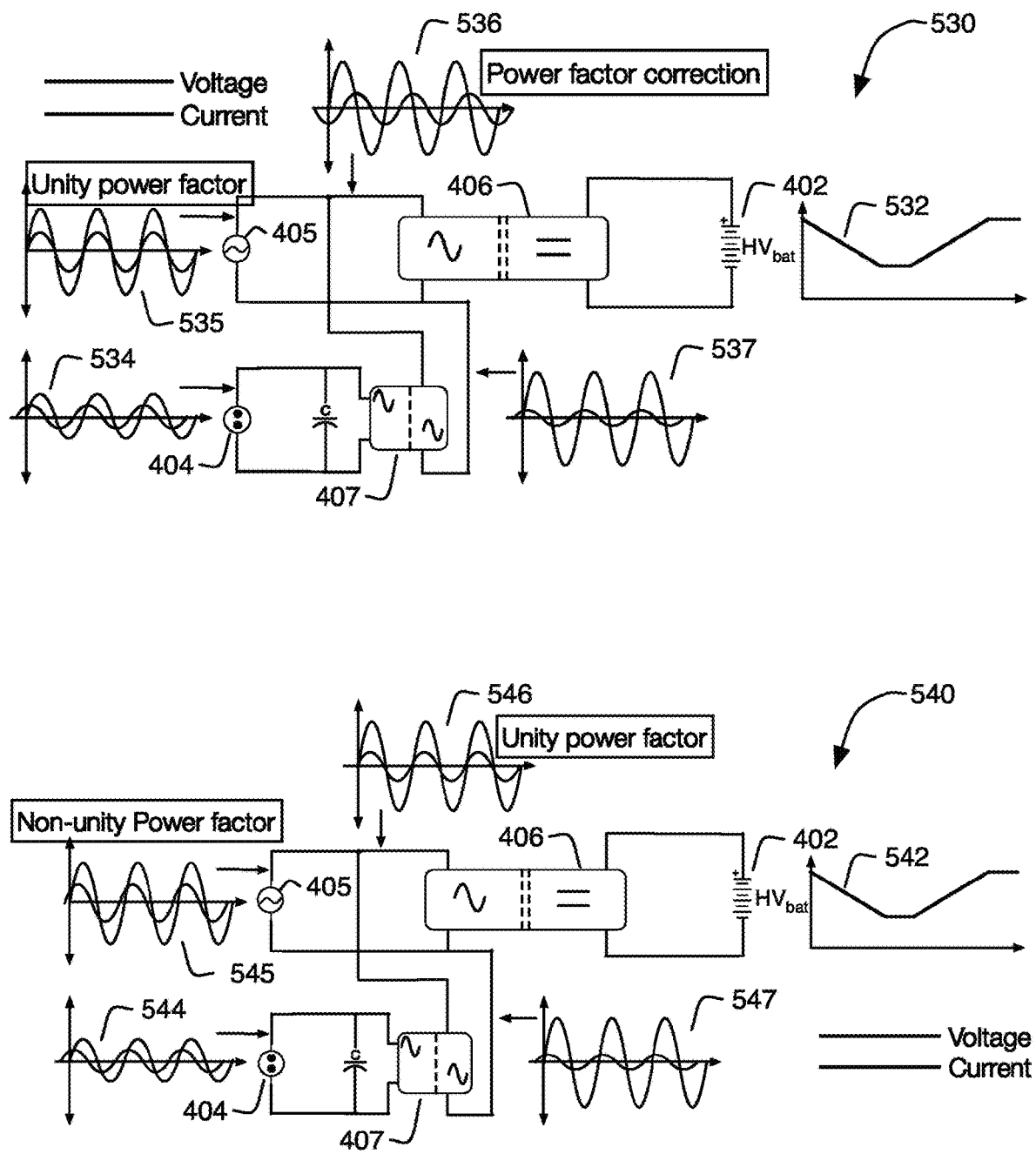
FIG. 5 illustrates power factor correction operating modes of a single-stage charger and non-isolated AC-AC converter circuit.

Charging mode 410 of electrical system 400 can allow for different HV battery charging modes to address power factor and harmonics, which are illustrated in FIG. 5. In a first power factor/harmonics corrected charging mode 530, a load imposed on convenience outlet 404 may exhibit a leading power factor, as illustrated in current/voltage plot 534. Such a load may also include relatively high harmonic content, which is not shown. As a result, the input side of AC-AC converter 407 may also exhibit a leading power factor, as illustrated in current voltage plot 537 (and also high harmonic distortion, not shown). To compensate for this, isolated AC-DC converter 506, operating in the charging mode, may be operated to exhibit a lagging power factor, as illustrated in current/voltage plot 536. More specifically, switching devices of DC-AC converter 406 may be adjusted so that a phase relationship between the input current and voltage of converter 406 (as shown in plot 536) corresponds to but is opposite in sense (lagging vs. leading) from a phase relationship between the input current and voltage of converter 407 (as shown in plot 537). Additionally, the switching devices of converter 406 may be operated to compensate for the harmonic content. As a result, AC grid 405 sees unity power factor operation, i.e., the input current and voltage are in phase, and a relatively harmonic free load. In this power factor and/or harmonic corrected mode, the power and reactive power needed to mitigate the harmonics and power factor are sourced from battery 402, which may result in some voltage variation of the high voltage battery, as illustrated by high voltage battery plot 532 (which also illustrates the overall charging operation). In some cases, convenience outlet 404 may exhibit a lagging power factor, in which case converter 406 could be operated to exhibit a leading power factor, thereby providing unity power factor operation as seen by grid 405.

In a second power factor/harmonics un-corrected charging mode 540, a load imposed on convenience outlet 404 may exhibit a leading power factor, as illustrated in current/voltage plot 544. Such a load may also include relatively high harmonic content, which is not shown. As a result, the input side of AC-AC converter 407 may also exhibit a leading power factor, as illustrated in current voltage plot 547 (and also high harmonic distortion, not shown). However, instead of compensating for this, isolated AC-DC converter 506, operating in the charging mode, may be operated to exhibit a unity power factor, as illustrated in current/voltage plot 546. As a result, AC grid 405 will not see unity power factor operation, i.e., the input current and voltage will be out of in phase, and will see the harmonic distortion associated with the load on convenience outlet for. An advantage of un-corrected mode 540 is that fewer voltage and current measurements are required and the control of AC-DC converter 406 may be simplified, as it need not adapt to the load presented via convenience outlet 404. The corresponding disadvantage is that the non-unity power factor and/or harmonic distortion introduced by the load on convenience outlet 404 will be seen by AC grid 405. Also, while it is in principle possible to separate power factor correction from harmonic compensation, the additional sensor and control capabilities required for either are essentially the same as required for both. Thus, as a practical matter, power factor correction and harmonic compensation are likely to be provided together (as in mode 530) or not provided (as in mode 540).

Figure 6A:
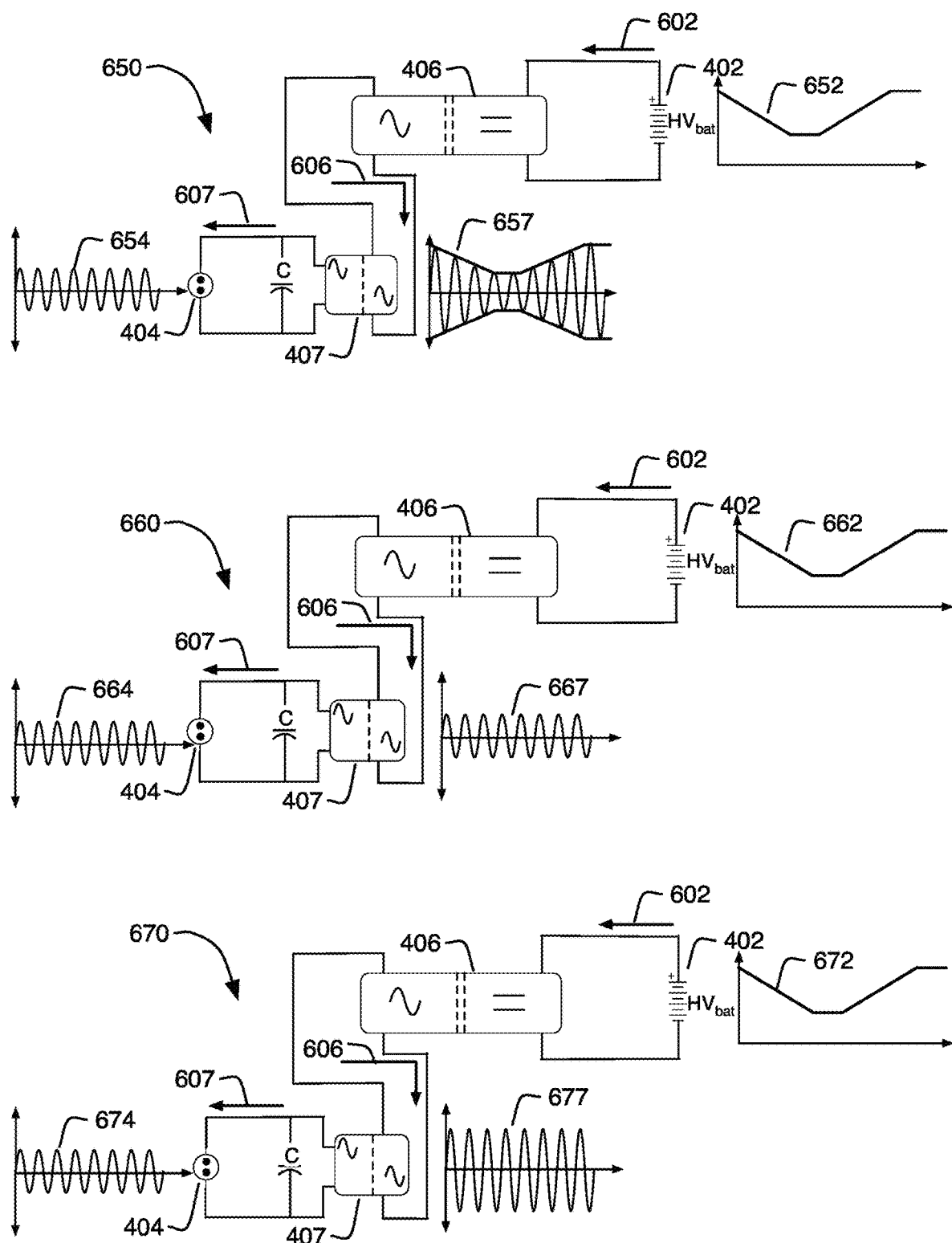
FIG. 6A illustrates certain operating modes of a single-stage charger and non-isolated AC-AC converter circuit.

Discharging mode 420 of Electrical system 400 can also allow for different HV battery discharging modes to enhance overall system efficiency. These different discharging modes 650, 660, and 670 are illustrated in FIG. 6A. In each of the discharging modes, energy flows from high voltage battery 402 to charger/converter 406 via path 602. Converter 406 converts this into an AC voltage delivered to AC-AC converter 407 via path 606. AC-AC converter 407 then converts this to a voltage suitable for convenience outlet 404, which is delivered via path 607.

In a first discharging mode 650, converter 406 may be operated at its maximum possible efficiency, meaning it will generate an AC output voltage with a magnitude that tracks the battery voltage 652 as illustrated in plot 657. In other words, the magnitude of this voltage will decrease as the battery discharges. In this mode, AC-AC converter 407 will perform the regulation necessary to produce the desired voltage 654 (e.g., 120V AC) for convenience outlet 404. As a result, converter 407 may exhibit relatively lower efficiency.

In second discharging mode 660, converter 406 may be operated to generate an AC output voltage suitable for convenience outlet 404, as illustrated in plot 667 (and 664), regardless of battery voltage 662. As a result, converter 406 may operate with relatively lower efficiency. However, in this mode, AC-AC converter 407 need not perform any further regulation, and, as a result, may exhibit very high efficiency.

In a third discharging mode 670, converter 406 may be operated to generate an AC output voltage 677 corresponding to the normally supplied grid voltage (e.g., 240V or 208V AC), without regard to battery voltage 672. As a result, converter 406 will operate with an intermediate efficiency between the two previously discussed modes 650 and 660. In mode 670, AC-AC converter 407 will perform a step-down as in one of the charging modes discussed above with reference to FIG. 5, and, as a result, converter 407 will exhibit an intermediate efficiency between the two previously discussed modes 650 and 660.

Depending on the specifics of a particular implementation, one of the foregoing modes 650, 660, or 670 may be more efficient. Thus, the mode providing optimal efficiency may be selected.

Figure 6B:
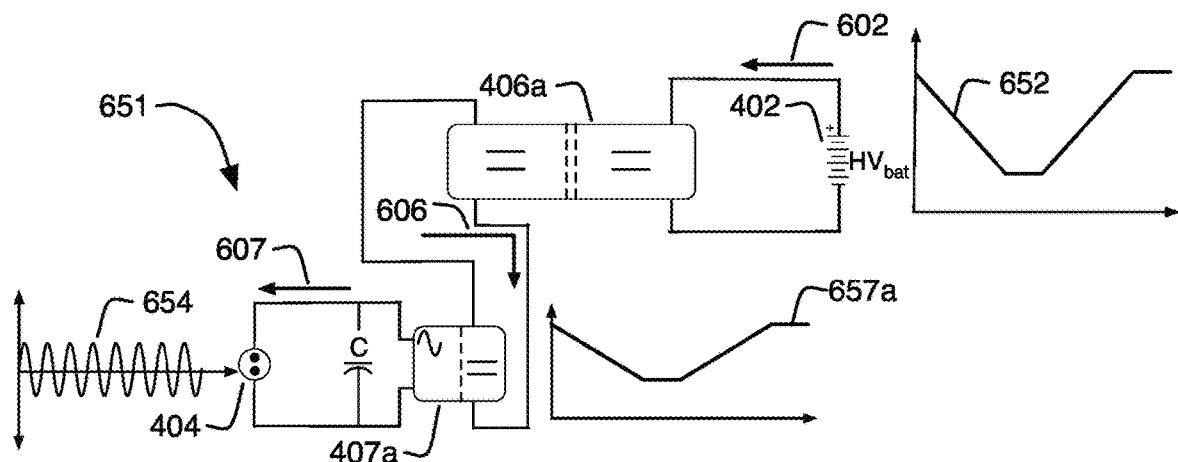
FIG. 6B illustrates additional operating modes of a single-stage charger and non-isolated AC-AC converter circuit.
Figure 6B:
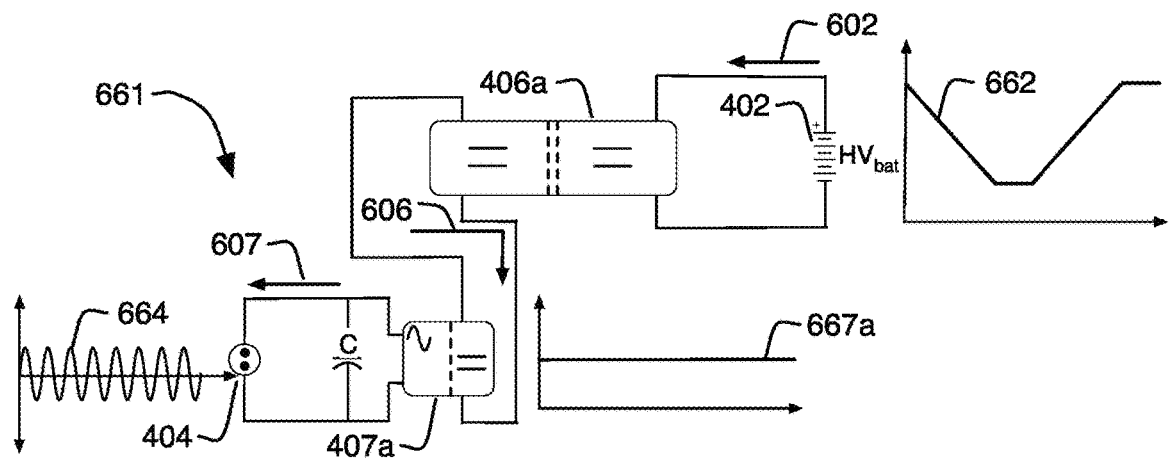
Figure 6B:
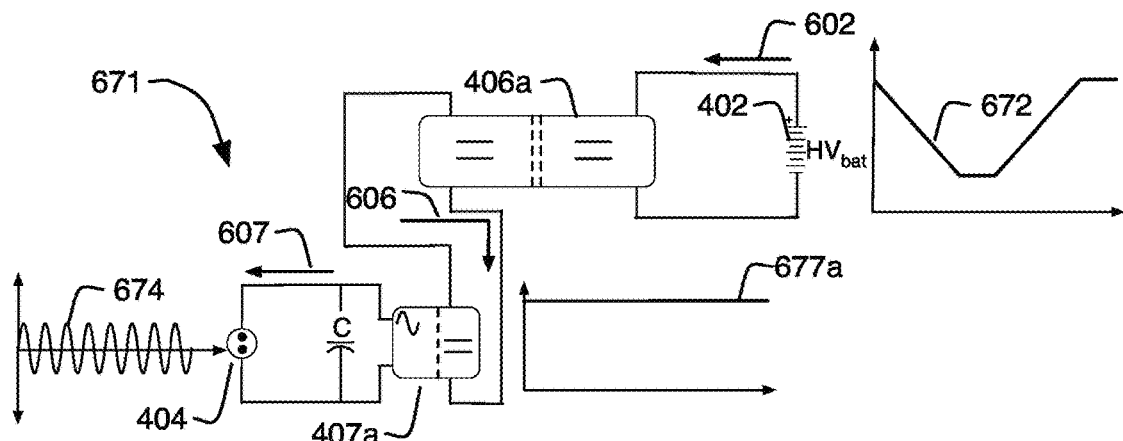

A second set of discharging modes may also be available for at least some topologies of converters 406 and 407, illustrated in FIG. 6B. In these discharging mode, isolated bidirectional converter 406a may be operated as a DC-DC converter to generate a DC output voltage that may be passed via path 606 to non-isolated converter 407a, which may be operated as an inverter to generate the AC voltage required by convenience outlet 404. For some converter topologies this may provide an overall system efficiency greater than any of the DC-AC modes 650, 660, 670 discussed above. In discharging mode 651, converter 406a may be operated at its maximum possible efficiency, meaning it will generate an output voltage with a magnitude that tracks the battery voltage 652 as illustrated in plot 657a. In other words, the magnitude of this voltage will decrease as the battery discharges. In this mode, DC-AC converter 407a will perform the regulation necessary to produce the desired voltage 654 (e.g., 120V AC) for convenience outlet 404. As a result, converter 407a may exhibit relatively lower efficiency.

In discharging mode 661, converter 406a may be operated to generate an output voltage with a magnitude suitable for convenience outlet 404, as illustrated in plot 667a (and 664), regardless of battery voltage 662. As a result, converter 406a may operate with relatively lower efficiency. However, in this mode, DC-AC converter 407a need not perform any further regulation, instead being used in, for example, an open loop 1:1 inverter mode. As a result, converter 407a may exhibit very high efficiency.

In discharging mode 671, converter 406a may be operated to generate an output voltage 677a corresponding to the normally supplied grid voltage (e.g., 240V or 208V AC), without regard to battery voltage 672. As a result, converter 406a will operate with an intermediate efficiency between the two previously discussed modes 650 and 660. In mode 671, DC-AC converter 407a will perform a step-down as in one of the charging modes discussed above with reference to FIG. 5. For example, converter 407a can operate in an open loop 2:1 step down inverter mode. As result, converter 407a will exhibit an intermediate efficiency between the two previously discussed modes 651 and 661. Depending on the specifics of a particular implementation, one of the foregoing modes 650, 660, or 670 may be more efficient. Thus, the mode providing optimal efficiency may be selected.

Figure 7:
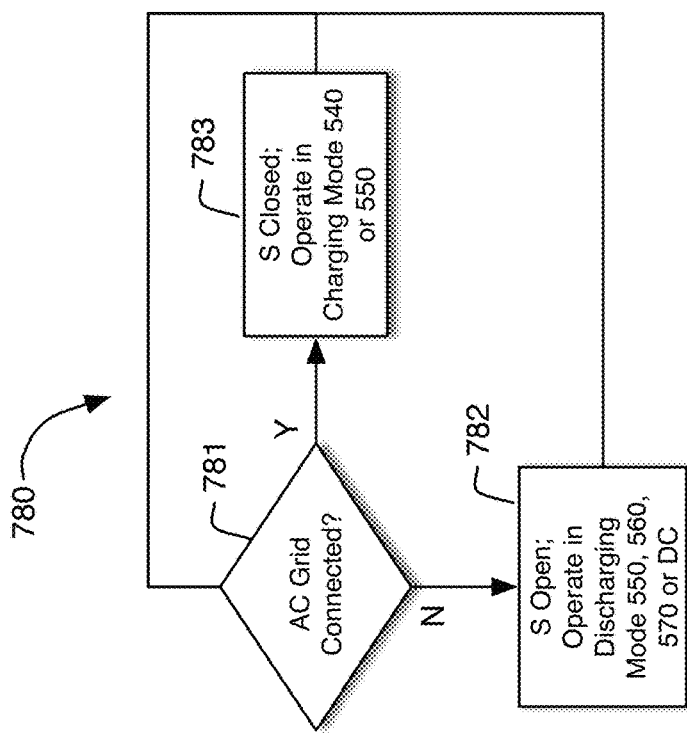
FIG. 7 illustrates a flow chart of operating modes of a single-stage charger and non-isolated AC-AC converter circuit.
Figure 4A:
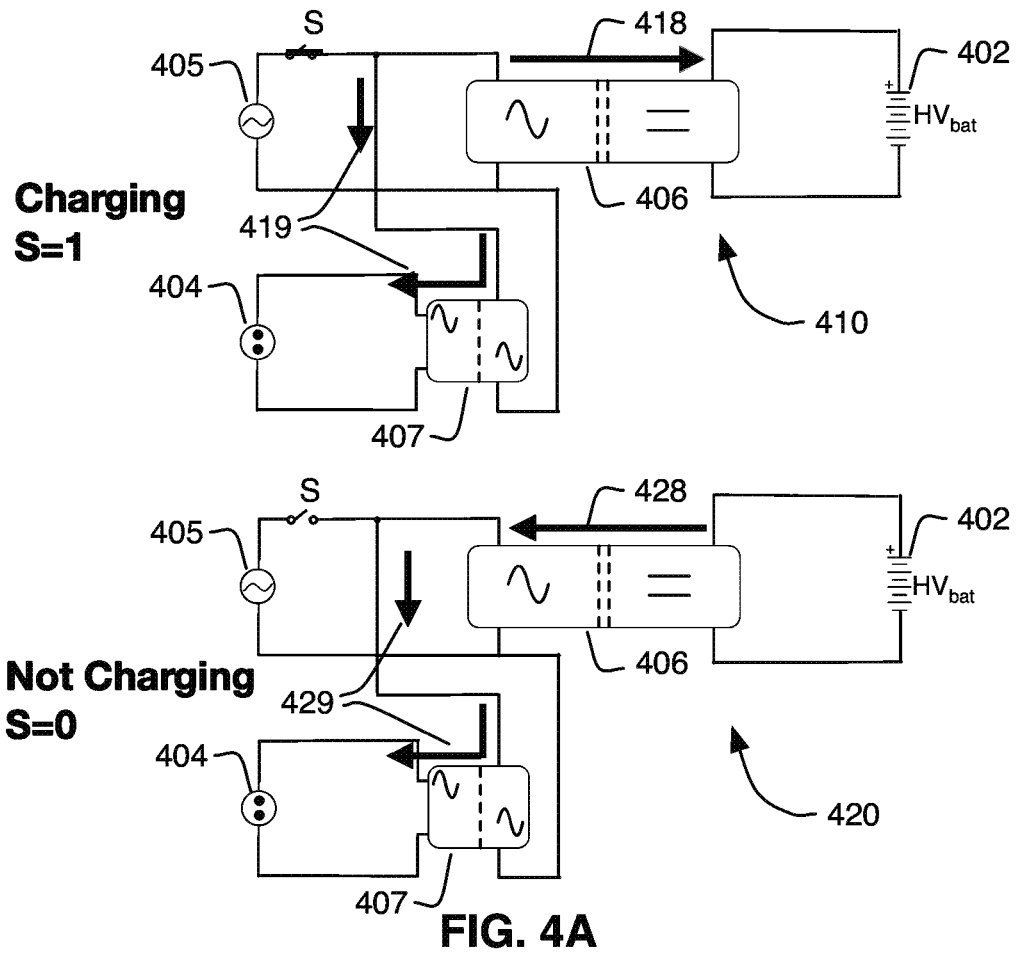
Figure 4B:
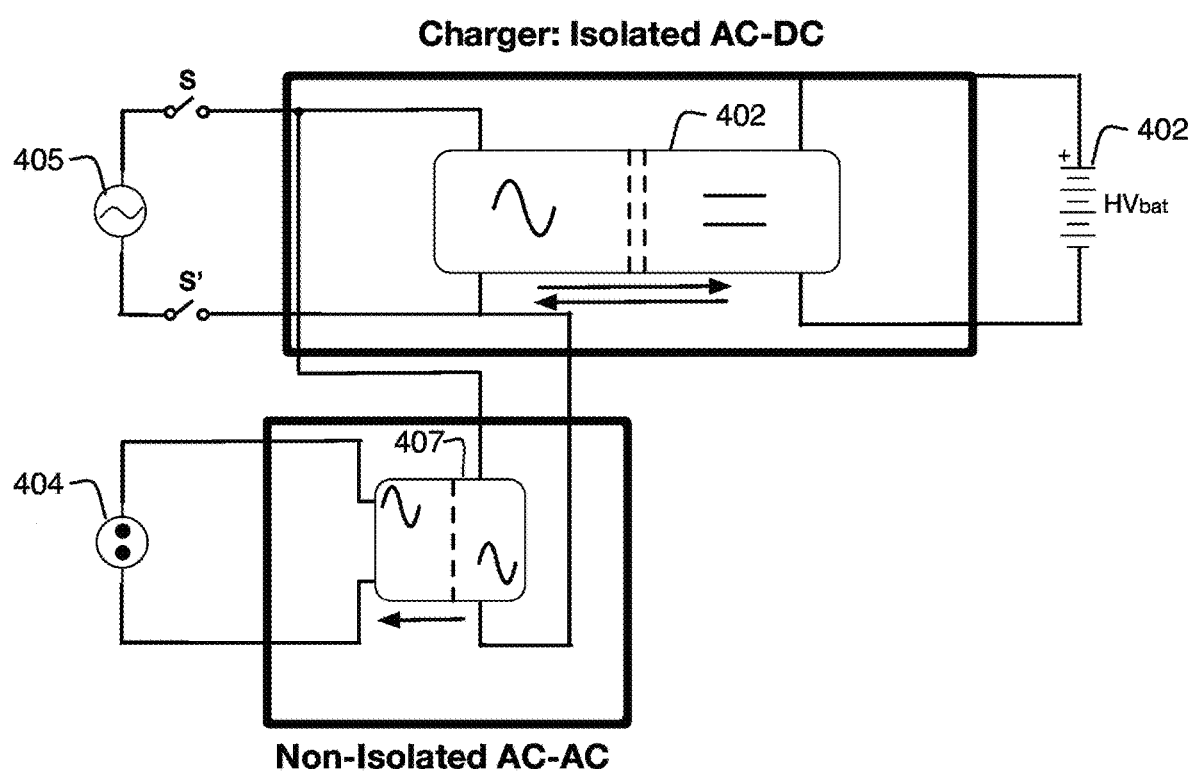
FIG. 4B illustrates alternative switch configurations of the charger circuit in FIG. 4A.

FIG. 7 illustrates a flow chart of an operating method 780 of the converter and operating modes of FIGS. 4-6. The flow chart may be implemented by any suitable controller circuitry, including a programmable controller (such as a microcontroller or microprocessor), a field programmable gate array, discrete logic control circuits, application specific integrated circuits, etc. Beginning at block 781, the controller can determine whether the AC grid is connected. If not, in block 782, the electrical system can be placed in the discharging mode 410, which can be selected from discharging modes 650, 660, 670, or the DC mode discussed above with reference to FIG. 6A. In this mode, switch S is open and isolated converter/charger 406 operates to provide power to converter 407 (and thus convenience outlet 404).

In block 381, if the controller determines that the AC grid is connected, then the controller can enter charging mode 420 (block 783), which can be selected from power factor correction and harmonics compensation charging modes 530 or 540 discussed above with reference to FIG. 5. In this mode, switch S is closed and isolated converter/charger 406 operates to provide power to the high voltage battery while the grid powers converter 407 (and thus convenience outlet 404).

Figure 8:
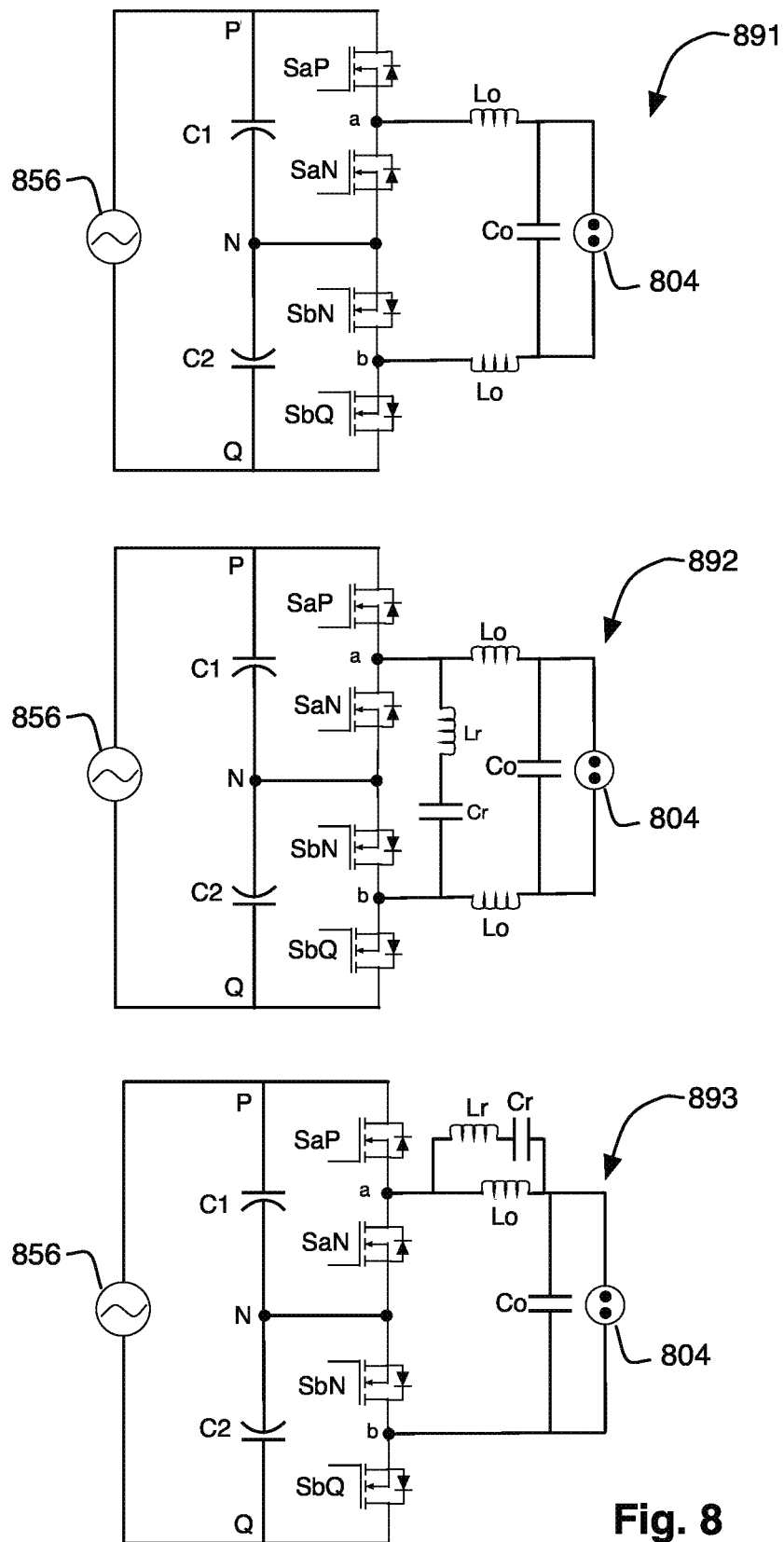
FIG. 8 illustrates exemplary topologies for a non-isolated AC-AC converter.

FIG. 8 illustrates exemplary AC-AC converter topologies 891,892, and 893 that may be used for converter 407 in the arrangements of FIGS. 4-7. Each converter topology 891-893 includes a stacked switching arrangement made up of switches SaP, SaN, SbN, and SbQ. An input AC voltage 856 may be input across the full switch stack at terminals P and Q. (In the DC embodiment discussed above, this input voltage may also be a DC input voltage.) An output AC voltage may be taken from the intermediate nodes a (located at the connection point of switches SaP and SaN) and b (located at the connection point of switches SbN and SbQ). In the illustrated embodiments, switches SaP and SaN are illustrated as n-channel MOSFETs, and switches SbQ and SbN are illustrated as p-channel MOSFETs; however, any suitable switching devices could be used as appropriate for a given implementation. Input capacitors may be coupled across the input, with their junction point being coupled to the neutral leg switches SaN and SbN. in each of the topologies 891,892, and 893, output terminals a and b may be coupled to convenience outlet 804 by different inductor/capacitor networks further described below.

For operation as an AC-AC converter, each topology 891-893 may be operated using pulse width modulation to generate the desired output voltage for convenience outlet 804. During the positive half cycle of AC input voltage 856, switches SaP and SaN may be operated with an alternating 50% duty cycle, while switches SbN/SbQ are constantly on. The width of the on-time pulses (i.e., the duration of the on times) of switches SaP and SaN will determine the magnitude of the AC voltage between terminals a and b (and thus presented to convenience outlet 804). During the negative half cycle of AC input voltage 856, switches SbQ and SbN may be operated with an alternating 50% duty cycle, while switches SaP/SaN are constantly on. The width of the on-time pulses (i.e., the duration of the on times) of switches SbQ and SbN will determine the magnitude of the AC voltage between terminals b and a (and thus presented to convenience outlet 804). This PWM mode of operation is applicable to all of the operating modes described above with reference to FIGS. 4-7 in which converter 407 provides AC voltage regulation for convenience outlet 404/804. Alternatively, converter topologies may also operate in a pass-through mode, in which the input voltage appearing across terminals P/Q is passed directly to output terminals a/b. In this mode, switches SaP an SaQ are turned on and switches SbQ and SbN are turned off. This passthrough mode of operation is applicable to all of the operating modes described above with reference to FIGS. 4-7 in which converter 407 does not provide AC voltage regulation for convenience outlet 404/804.

In topology 891, output filter inductors Lo and output filter capacitor Co are provided to smooth the output voltage delivered to convenience outlet 804. In topologies 892 and 893, resonant capacitor Cr and resonant inductor Lr may also be provided to form a resonant tank that allows for zero voltage switching (ZVS) of the switching devices. More specifically, when alternating from the positive half cycle to the negative half cycle, or vice versa, resonance of the tank circuit provides a current reversal to force the filter inductor current negative allowing for zero voltage switching.

Figure 9:
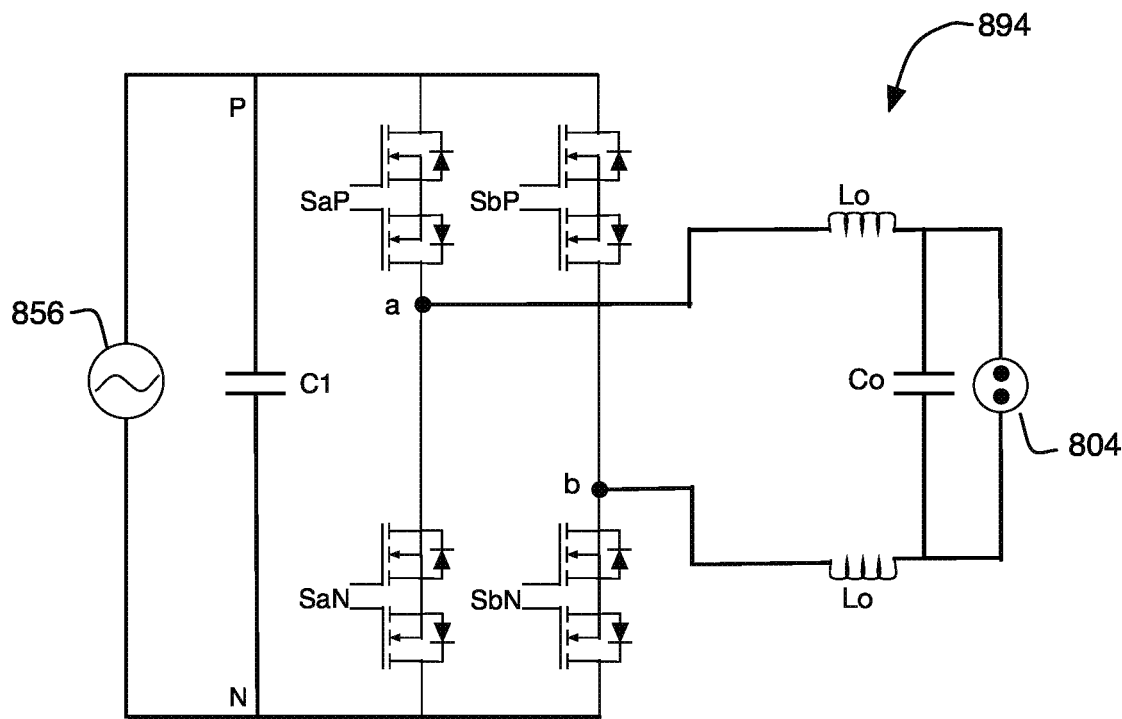
FIG. 9 illustrates further exemplary topologies for a non-isolated AC-AC converter.
Figure 9:
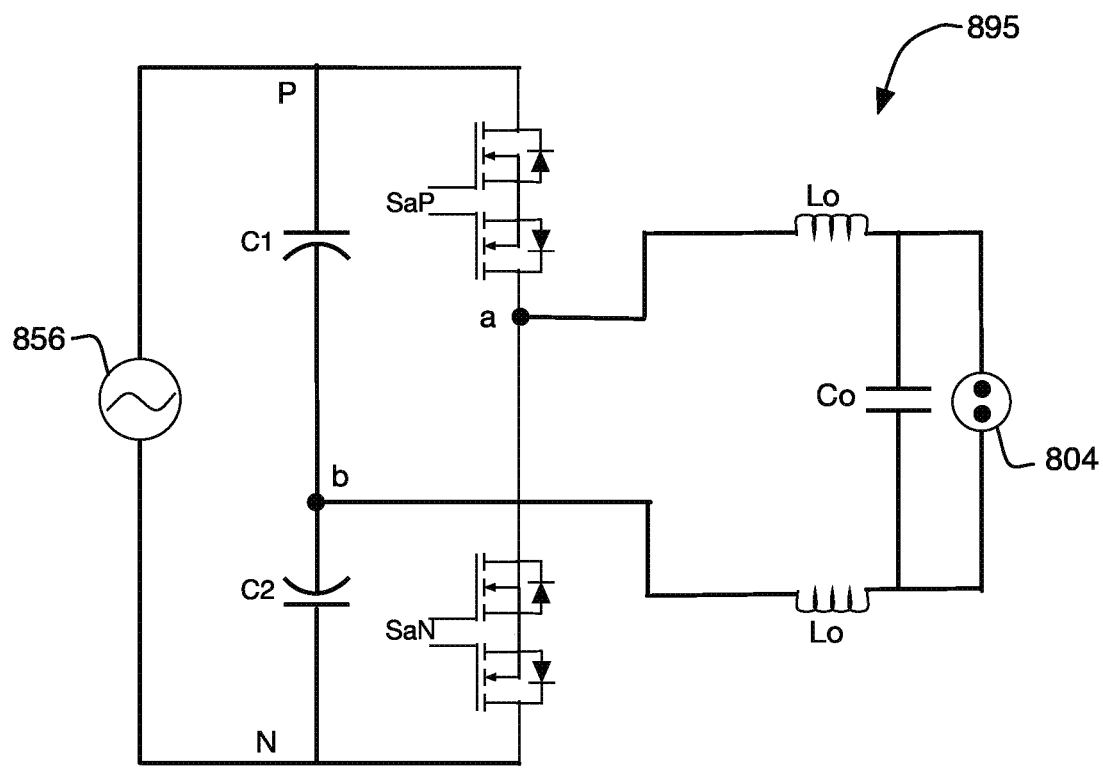

FIG. 9 illustrates additional AC-AC topology configurations that incorporate bidirectional switches. Topology 894 illustrates a full bridge AC-AC converter using bidirectional switches SaP, SbP, SaN, and SbN. Topology 895 illustrates a half bridge AC-AC converter with switches SaP and SaN. In each configuration, an input AC voltage 856 may be input at terminals P and Q. In the full bridge configuration 894, an output AC voltage may be taken from the intermediate nodes a (located at the connection point of switches SaP and SaN) and b (located at the connection point of switches SbP and SbN). In the half bridge configuration 895, an output AC voltage may be taken from intermediate nodes a (located at the connection point of switches SaP and SaN) and b (located at the connection point of input capacitors C1 and C2).

For operation as an AC-AC converter, each topology 894-895 may be operated using pulse width modulation to generate the desired output voltage for convenience outlet 804. Such PWM modes of operation are broadly similar to those discussed above, accounting for the bidirectionality of the switching devices. These PWM modes of operation are applicable to all of the operating modes described above with reference to FIGS. 4-7 in which converter 407 provides AC voltage regulation for convenience outlet 404/804. Alternatively, converter topologies may also operate in a pass-through mode, in which the input voltage appearing across terminals P/Q is passed directly to output terminals a/b. This passthrough mode of operation is applicable to all of the operating modes described above with reference to FIGS. 4-7 in which converter 407 does not provide AC voltage regulation for convenience outlet 404/804. Additionally, converter topologies 894-895 can include output filter and zero voltage switching circuits as described above with respect to FIG. 8.

The foregoing describes exemplary embodiments of battery-based DC power systems that may repurpose charger circuitry to provide an AC voltage for convenience outlets or other AC loads. Such systems may be used in a variety of applications but may be particularly advantageous when in conjunction with electric and hybrid electric vehicles, grid battery storage systems, portable power banks, and the like. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

Additionally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electrical system comprising:
an isolated bidirectional converter having an input couplable to an AC grid connection and an output couplable to a battery;
a non-isolated converter having an input coupled to the input of the isolated bidirectional converter and selectively couplable to the AC grid connection and an AC output coupled to a convenience outlet;
a switch that selectively couples the input of the isolated bidirectional converter and the input of the non-isolated converter to the AC grid connection; and
a controller configured to toggle the switch and control operation of the isolated bidirectional converter and the non-isolated converter to operate in one or more of a plurality of modes including:
a charging mode in which the isolated bidirectional converter operates in a forward direction to charge the battery and the non-isolated converter powers the convenience outlet from the grid connection; and
a non-charging mode in which the isolated bidirectional converter operates in a reverse direction to power the non-isolated converter from the battery and the non-isolated converter powers the convenience outlet, wherein the non-charging mode includes at least one of:
a first discharging mode in which the isolated bidirectional converter is operated in the reverse direction to produce a DC output voltage having a magnitude tracking the battery voltage;
a second discharging mode in which the isolated bidirectional converter is operated in the reverse direction to produce a DC output voltage having a magnitude suitable for the convenience outlet; and
a third discharging mode in which the isolated bidirectional converter is operated in the reverse direction to produce a DC output voltage having a magnitude corresponding to a voltage of the AC grid.

2. The electrical system of claim 1 wherein the switch is a single pole switch.

3. The electrical system of claim 1 wherein:
in the charging mode the controller closes the switch; and
in the discharging mode the controller opens the switch.

4. The electrical system of claim 1 wherein the charging mode includes at least one of a power factor correction mode and a harmonics compensation mode, wherein:
in the power factor correction mode the isolated bidirectional converter is operated to correct the power factor of a load coupled to the convenience outlet such that the grid connection sees a unity power factor; and
in the harmonics compensation mode the isolated bidirectional converter is operated to compensate for harmonics introduced by the load coupled to the convenience outlet.

5. The electrical system of claim 1 wherein:
in the first discharging mode the isolated bidirectional converter operates as a pass-through inverter;
in the second discharging mode the isolated bidirectional converter performs regulation of the AC output voltage for the convenience outlet; and
in the third discharging mode the isolated bidirectional converter operates as a fixed ratio inverter.

6. The electrical system of claim 1 wherein the non-isolated converter comprises:
a stack of four switching devices, wherein an input of the non-isolated converter is coupled across the stack of four switching devices, and an output of the non-isolated converter is taken from a connection point of first and second switching devices of the stack and a junction of third and fourth switching devices of the stack;
input capacitors coupled in series across the input of the non-isolated converter, with a connection point of the input capacitors coupled to a connection point of the second and third switching devices; and
at least one output filter inductor and at least one output filter capacitor coupled to the output of the non-isolated converter.

7. The electrical system of claim 6 wherein the non-isolated converter further comprises a resonant tank made up of at least one resonant capacitor and at least one resonant inductor, wherein the resonant tank facilitates zero voltage switching of the switching devices.

8. The electrical system of claim 1 wherein the non-isolated converter comprises:
a plurality of bidirectional switching devices, wherein an input of the non-isolated converter is coupled across the bidirectional switching devices and an output of the non-isolated converter is taken from a connection point of the bidirectional switching devices;
at least one input capacitor coupled across the input of the non-isolated converter; and
at least one output filter inductor and at least one output filter capacitor coupled to the output of the non-isolated converter.

9. The electrical system of claim 8 wherein the bidirectional switches are configured as a full bridge converter.

10. The electrical system of claim 8 wherein the bidirectional switches are configured as a half bridge converter.

\* \* \* \* \*